(12) United States Patent
Chhabra

(10) Patent No.: US 12,290,715 B2
(45) Date of Patent: May 6, 2025

(54) EXERCISE MAT WITH YOGA TOWEL ASSEMBLY

(71) Applicant: Yoga Ether LLC, Pleasanton, CA (US)

(72) Inventor: Rohit Chhabra, Mountain View, CA (US)

(73) Assignee: Yoga Ether LLC, Pleasanton, CA (US)

( * ) Notice: Subject to any disclaimer, the term of this patent is extended or adjusted under 35 U.S.C. 154(b) by 234 days.

(21) Appl. No.: 17/799,651

(22) PCT Filed: Feb. 8, 2021

(86) PCT No.: PCT/IB2021/051017
§ 371 (c)(1),
(2) Date: Aug. 12, 2022

(87) PCT Pub. No.: WO2021/161155
PCT Pub. Date: Aug. 19, 2021

(65) Prior Publication Data
US 2023/0087677 A1 Mar. 23, 2023
US 2024/0421702 A9 Dec. 19, 2024

Related U.S. Application Data

(63) Continuation of application No. 16/788,310, filed on Feb. 12, 2020, now abandoned, which is a continuation-in-part of application No. 29/627,587, filed on Nov. 28, 2017, now Pat. No. Des. 879,510, which is a continuation-in-part of application No. 29/600,495, filed on Apr. 13, 2017, now Pat. No. Des. 878,811.

(51) Int. Cl.
*A63B 21/00* (2006.01)
*A47K 10/02* (2006.01)
(Continued)

(52) U.S. Cl.
CPC .......... *A63B 21/4037* (2015.10); *A47K 10/02* (2013.01); *H02M 1/08* (2013.01); *H02M 1/36* (2013.01); *H02M 3/01* (2021.05); *H02M 3/33573* (2021.05); *H02M 7/5387* (2013.01); *A47G 27/0237* (2013.01);
(Continued)

(58) Field of Classification Search
CPC ............ H02M 1/36; H02M 1/08; H02M 3/01; H02M 3/33573; H02M 7/5387; H02M 1/007; H02J 3/381; H02J 2300/24; A47G 27/0237; A63B 21/4037; A47K 10/02
See application file for complete search history.

(56) References Cited

U.S. PATENT DOCUMENTS 8,765,253 B1 7/2014 Smaldone et al.
2005/0192158 A1 9/2005 Edwards
(Continued)

FOREIGN PATENT DOCUMENTS

WO WO-2013163669 A1 * 11/2013 ......... A63B 21/4037
WO WO-2021161155 A1 * 8/2021 ......... A63B 21/4037

*Primary Examiner* — Sundhara M Ganesan
(74) *Attorney, Agent, or Firm* — Chhabra Law Firm, PC

(57) ABSTRACT

An assembly, in one embodiment, comprising an exercise mat having a top layer and a bottom layer, and a towel is described. The top layer of the exercise mat is configured to have a first exposed surface. The towel comprises a first surface and second surface, the first surface configured to be coupled to the first exposed surface of the top layer of the exercise mat, the surface area of the towel being less than or equal to a surface area of the top surface of the exercise mat.

14 Claims, 11 Drawing Sheets

(51) Int. Cl.
  *H02M 1/08*      (2006.01)
  *H02M 1/36*      (2007.01)
  *H02M 3/00*      (2006.01)
  *H02M 3/335*     (2006.01)
  *H02M 7/5387*    (2007.01)
  *A47G 27/02*     (2006.01)
  *H02J 3/38*      (2006.01)
  *H02M 1/00*      (2006.01)

(52) U.S. Cl.
  CPC ........... *A63B 2209/10* (2013.01); *H02J 3/381* (2013.01); *H02J 2300/24* (2020.01); *H02M 1/007* (2021.05)

(56) References Cited

U.S. PATENT DOCUMENTS

| | | | |
|---|---|---|---|
| 2006/0073305 A1* | 4/2006 | Kole | A63B 21/4037 428/80 |
| 2009/0239724 A1* | 9/2009 | White | A63B 21/4037 482/142 |
| 2012/0124739 A1 | 5/2012 | Crowne | |
| 2013/0125306 A1* | 5/2013 | Andrews | A47G 9/06 5/417 |
| 2014/0068858 A1* | 3/2014 | Wambeke | A47G 9/062 5/420 |
| 2015/0328495 A1* | 11/2015 | Soba | A63B 21/4035 5/417 |
| 2016/0129300 A1 | 5/2016 | Moore et al. | |
| 2016/0332023 A1 | 11/2016 | Taylor et al. | |
| 2017/0036060 A1* | 2/2017 | Fishbein | A63B 21/4037 |
| 2017/0080278 A1* | 3/2017 | Wiggins | A47K 10/02 |
| 2017/0319896 A1* | 11/2017 | Kramer | A63B 21/4037 |
| 2018/0243166 A1* | 8/2018 | Splichal | A43B 7/146 |
| 2018/0250548 A1* | 9/2018 | Wasmer | A63B 21/4037 |
| 2020/0179746 A1* | 6/2020 | Ruse | A63B 21/4037 |
| 2020/0179747 A1* | 6/2020 | Chhabra | A47G 9/062 |
| 2020/0359851 A1* | 11/2020 | Lucero, III | A47K 10/02 |
| 2023/0210280 A1* | 7/2023 | Leach | A47G 9/062 5/419 |

* cited by examiner

EXERCISE MAT WITH YOGA TOWEL ASSEMBLY

CROSS REFERENCE TO RELATED APPLICATIONS

The present application is the national stage application, submitted under 35 U.S.C. 371, and by virtue of 35 U.S.C. 363 claims the filing date of PCT/IB2021/051017, filed Feb. 8, 2021, which further claims priority from U.S. patent application Ser. No. 16/788,310 (abandoned), filed on Feb. 12, 2020, which is further a continuation-in-part of, and claims priority from, U.S. Design Pat. No. D879510, issued on Mar. 11, 2020, which further is a continuation-in-part, and claims priority from U.S. Design Pat. No. D878811, issued on Mar. 4, 2020. The contents of the above mentioned patent applications are incorporated herein by reference for all purposes to the extent that such subject matter is not inconsistent herewith.

FIELD OF THE INVENTION

Embodiments of the present invention relates generally to the field of fitness products. More particularly, embodiments of the invention relate to an assembly of an exercise mat with removable towel assembly.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Exercise mats have become famous with the popularity of Yoga/Pilates with fitness and health conscious people in the western world. With the introduction of hot yoga, non-slip, sweat/moisture absorbing mats have been on high demand. Generally, with the absorption of sweat, cleaning an exercise (e.g., yoga) mat becomes challenging, since any liquid based cleaning product would also be absorbed into the mat. Alternatively, cleaning with warm soapy water or in a washing machine requires air-drying (or tumble drying) the mat is an inconvenient and time consuming process.

As an alternative to washing exercise mats, or applying chemicals directly to a mat, mat towels have been introduced. A towel is placed on top of an exercise mat, and the user does not come in direct contact with the mat. Further, most of the sweat is absorbed by the towel, thereby reducing (or minimizing) the absorption of sweat by the mat. Using a towel has an added advantage that any chemicals applied to the mat (for cleaning purposes), do not come in direct contact with the user, and further the towel reduces, if not eliminates, the need to periodically wash the mat.

However, towels usually slip/dislodging or move around when the user is practicing a fitness exercise that involves movement (e.g., yoga) from one pose (or position) to another, which results in sweat coming in direct contact with the mat. Sweat can also make the mat slippery, thus increasing the chances of injury. Further, slipping/dislodging of the towel results in folding/uneven distribution of the towel on the mat, thereby causing an uneven surface which makes it difficult to perform the pose or exercise. Thus, what is needed are assemblies, apparatuses, and techniques that can prevent, or greatly reduce, a yoga towel from moving/dislodging or slipping when a user is exercising or practicing yoga. Further, what is needed are new techniques to create yoga mats that can take advantage of the yoga towel described herein.

SUMMARY OF THE DESCRIPTION

Embodiments of the present invention are best understood by reference to the detailed figures and description set forth herein. Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive. Compounds, materials, manufacturing techniques, uses, and applications, described herein, as these may vary.

It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. It is to be further understood that the present invention is not limited to the particular methodology in the art. Similarly, for another example, a reference to "a step" or "a means" is a reference to one or more steps or means and may include sub steps and subservient means.

All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

In one embodiment, an assembly comprising an exercise mat and a yoga towel is described. The exercise mat can have a top layer and a bottom layer, the top layer having a first exposed surface. The yoga towel comprises a first surface and second surface, where the first surface of the yoga towel is configured to be coupled to the first exposed surface of the top layer of the exercise mat, and a surface area of the yoga towel is less than or equal to a surface area of the top surface of the exercise mat. In one embodiment, the surface area of the yoga towel is determined by $(w \times l) - s$, where w is the length of the exercise mat, and l is the width of the exercise mat, and s is equivalent to an area removed from the yoga towel to achieve a desired shape or size. In one embodiment, s is determined as: π.a.b, where a and b are rational numbers that are less than half the measurement of w and l respectively. In another embodiment, s is determined as: $2r^2$, where r is a rational number that is less than half the measurement of W. In another embodiment, s is determined as:

$$2a.b - \frac{\pi.a.b}{4}$$

wherein a and b are rational numbers that are less than half the measurement of w and l respectively.

In yet another embodiment, the first surface of the yoga towel is coupled to the top surface of the exercise mat by a plurality of fasteners. In one embodiment, at least one fastener is a hook and loop fastener. In one embodiment, a portion of the hook and loop fastener is coupled to the first surface of the yoga towel, and wherein another portion of the hook and loop fastener is coupled to the top surface of the exercise mat. In one embodiment, the portion of the hook and loop fastener is coupled to the first surface of the yoga towel is a male component of the hook and loop fastener, and another portion of the hook and loop fastener is coupled to the top surface of the exercise mat is a female component of the hook and loop faster. In one embodiment, the portion of the hook and loop fastener is coupled to the first surface of the yoga towel is a female component of the hook and loop fastener, and the other portion of the hook and loop fastener is coupled to the top surface of the exercise mat is a male component of the hook and loop faster.

In one embodiment, wherein each corner of the yoga towel is at least one of chamfered, scalloped, or fileted. In one embodiment, the second surface of the yoga towel is configured to accommodate a user to perform an exercise.

In yet another embodiment, an exercise mat is described. The exercise mat can have a bottom layer providing traction when placed in contact with a surface, and a top layer coupled on top of the bottom layer, where at least a portion of the top layer comprises a water resistant surface. In one embodiment, the top layer can be configured to comprise at least a first material and a second material. The first and second materials can be made of different compositions. In one embodiment, the first material comprises a thermoplastic elastomer, polyurethane, cork, or any combination thereof and the second material comprises natural rubber, synthetic rubber, or a combination thereof. In one embodiment, the top layer is embedded proximally into the bottom layer. In another embodiment, the top layer is configured to provide a surface to a user for exercising. The exercise mat can be coupled to a yoga towel using a plurality of fasteners. The plurality of fastener can include a hook and loop based fasteners.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
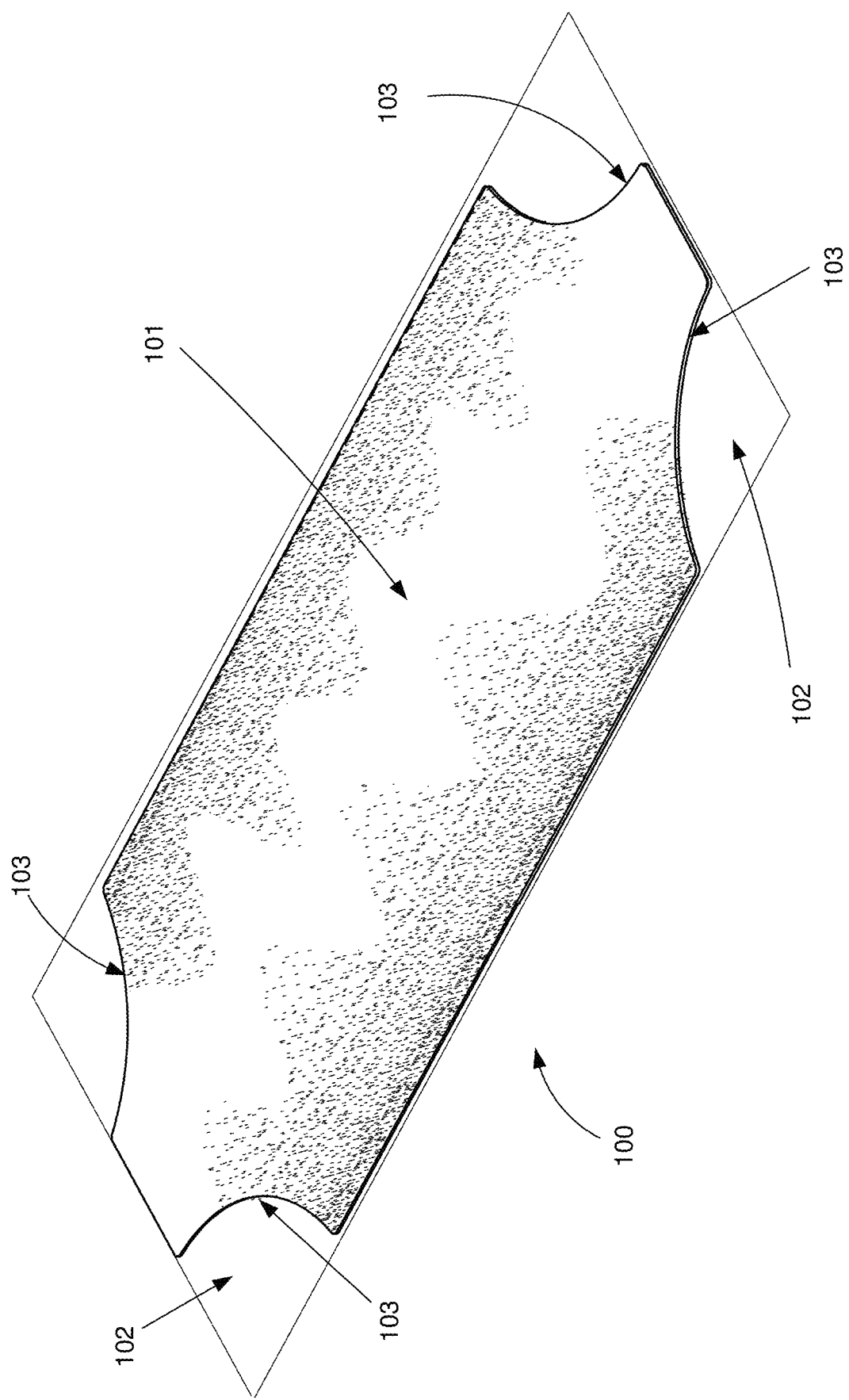
FIG. 1 illustrates a diagram, showing a perspective view of an exercise mat and towel assembly 100 showing a towel coupled to an exercise mat, according to one embodiment of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention.

Structures described herein are to be understood also to refer to functional equivalents of such structures. The present invention will now be described in detail with reference to embodiments thereof as illustrated in the accompanying drawings. From reading the present disclosure, other variations and modifications will be apparent to persons skilled in the art. Such variations and modifications may involve equivalent and other features which are already known in the art, and which may be used instead of or in addition to features already described herein. Although Claims may have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention.

A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Those skilled in the art will readily recognize, in light of and in accordance with the teachings of the present invention, that any of the foregoing steps may be suitably replaced; reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation. The present invention will now be described in detail with reference to embodiments thereof as illustrated in the accompanying drawings.

FIG. 1 illustrates a diagram, showing a perspective view of an exercise mat and towel assembly 100 showing a towel coupled to an exercise mat, according to one embodiment of the present invention. As illustrated, towel 101 can be coupled to exercise mat 102. In one embodiment, such coupling can occur by placing a surface of towel 101 on a top surface of exercise mat 102. In one embodiment, assembly 100 includes an exercise mat having a top layer and a bottom layer, with the top layer having an exposed surface to which a towel can be coupled. The assembly can also include a towel comprising a first surface and second surface; in one embodiment, the first surface of the towel is configured to be coupled to the first exposed surface of the top layer of the exercise mat. In one embodiment, the surface area of the towel is configured to be less than or equal to a surface area of the top surface of the exercise mat 102.

As illustrated, towel 101 can be configured to be rectangular in shape having concave shaped corners 103, as illustrated. Concave shaped chamfers form corners 103, in one embodiment, are also referred to as scalloped corners by a person having ordinary skill in the art. Each concave shaped chamfer 103 of the towel can be configured by removing a section of the towel that is approximately a quarter of a circle having radius r from each corner of a rectangular towel of length l and width w, where r is less than l and w, and where r, l, and w are rational numbers. Therefore, a surface area of $$\frac{\pi . r^2}{4}$$

is removed from each corner of the rectangular mat to form each concave shape chamfer 103. Thus, a total surface area of $\pi r^2$ is removed from a towel having surface area of l×w, thereby towel 101 having a resultant surface area of:

$(l \times w) - \pi r^2$.

In one embodiment, r is less than w÷2. In one embodiment, towel 101 can be coupled to an exercise mat 102 with length and width equal or more than that of a rectangular towel of length l and width w.

In a preferred embodiment, each concave shaped chamfer 103 can be configured by removing a section of towel that is approximately a quarter of an ellipse with the semi-minor axis length equal to a, and semi-major axis length equal to b, from each corner of a rectangular towel having length l and width w, where w, l, a, and b are rational numbers. Therefore, in this embodiment, each concave corner 103 is formed by removing a surface area of $$\frac{\pi . a . b}{4}$$

from a rectangular mat having a surface area of w×l, thereby having the towel having a resultant surface area of:

$(l \times w) - \pi . a . b$.

In one embodiment, a (the semi-minor axis of an ellipse) and b (the semi-major axis of the ellipse) are less than half the measurement of w and l respectively.

Figure 2:
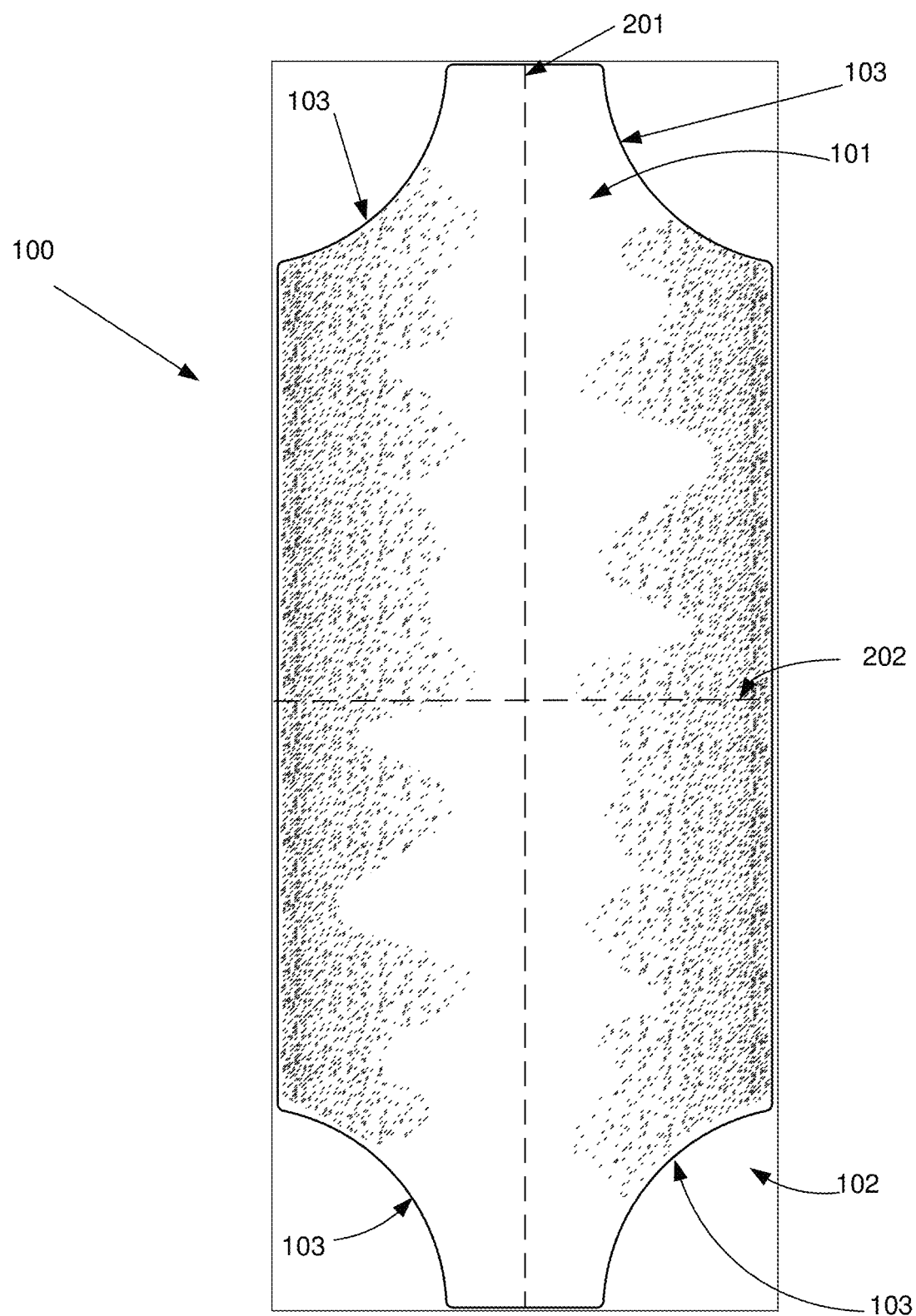
FIG. 2 illustrates a top view diagram of an exercise mat and towel assembly, according to one embodiment of the present invention.

FIG. 2 illustrates a top view diagram of an exercise mat and towel assembly, according to one embodiment of the present invention. In one embodiment, since towel 101 is not rectangular in shape, w and l can be measured from a horizontal midline 202 (that is, a midline that horizontally divides towel 101 in the middle), and vertical midline 201 (that is, a midline that vertically divides towel 101 in the middle) of towel 101, respectively.

Horizontal midline 202 and vertical midline 201 are illustrated as dashed lines since these lines are not physically demarcated on towel 101 and are presented herein for illustration purposes only; horizontal midline 202 and vertical midline 201 signify the location of each midline relative to towel 101.

In one embodiment, towel 101 is coupled to mat 102 by mating vertical midline 201 to the vertical midline of exercise mat 102 and further mating horizontal midline 202 with horizontal midline of exercise mat 102.

Figure 3:
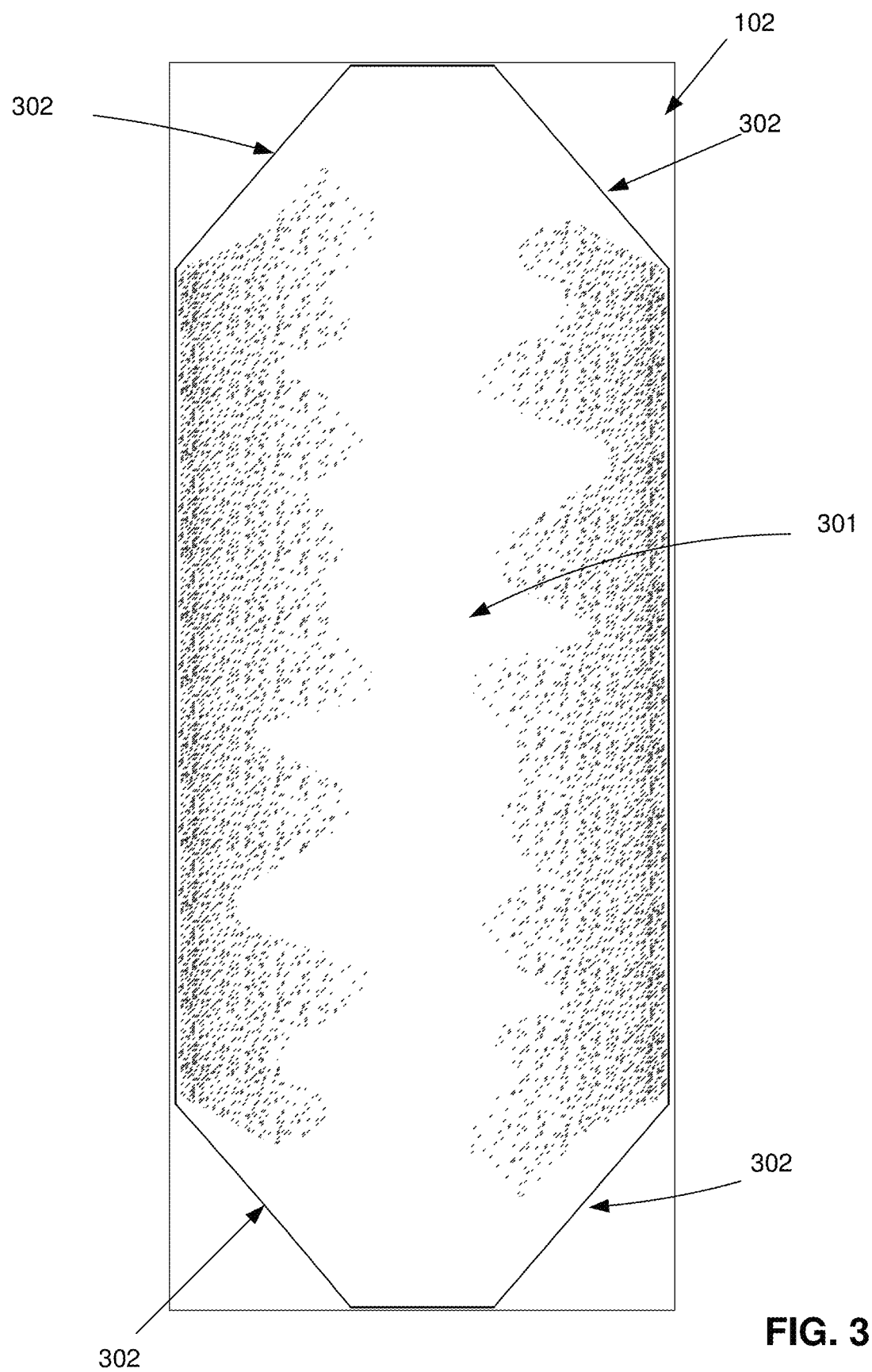
FIG. 3 illustrates a diagram of an embodiment of an exercise mat and towel assembly, according to one embodiment of the present invention.

FIG. 3 illustrates a diagram of an embodiment of an exercise mat and towel assembly, according to one embodiment of the present invention. As illustrated, in one embodiment towel 301 can be configured by removing triangular shaped sections from the corners of a rectangular shaped towel to form edges 302. As illustrated, towel 301 can be configured to expose corners of exercise mat 102 by removing a section from each corner of towel 301. In this embodiment, a section having surface area of $$\frac{u.v}{2}$$

is removed from each corner of a towel 301 having length l and width w where u, v, w and l are rational numbers, and where u and v are less than half the measurement of w and l respectively. Thus, in this embodiment, the resultant surface area of towel 301 equates approximately to:

$$(l \times w) - 2(u \times v)$$

Figure 4:
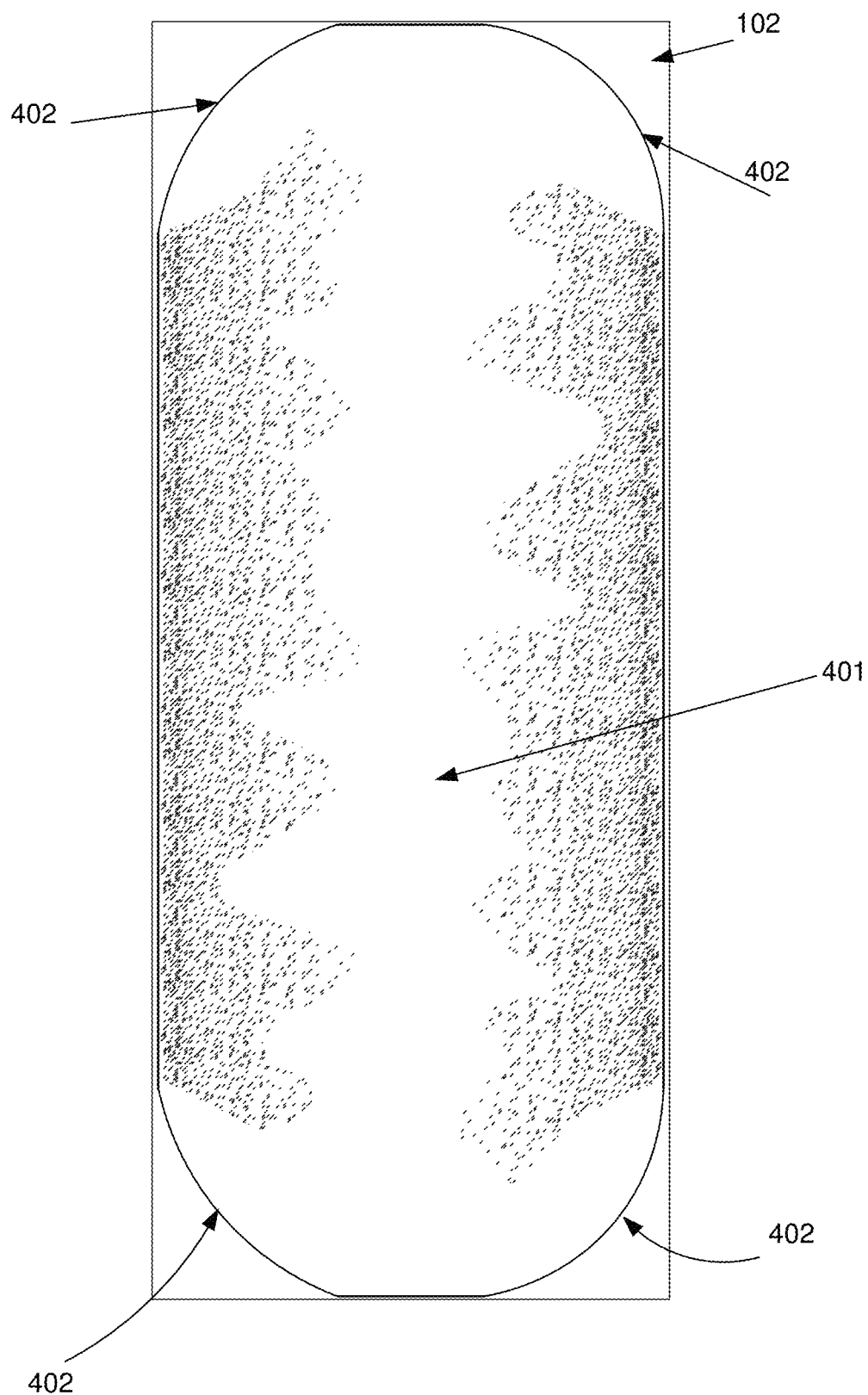
FIG. 4 illustrates a diagram of one embodiment of an exercise mat and towel assembly, according to one embodiment of the present invention.

FIG. 4 illustrates a diagram of one embodiment of an exercise mat and towel assembly, according to one embodiment of the present invention. Towel 401 can be configured to expose corners of exercise mat 102 by removing a section from each corner of towel 401. As illustrated, towel 401 can be configured to have convex shaped chamfers forming corners 403, as illustrated. In this embodiment, a surface area of $$2a.b - \frac{\pi.a.b}{4}$$

can be removed from each corner of a towel having a total surface area of (l×w); with the semi-minor axis length of an ellipse equal to a, and semi-major axis length of the ellipse equal to b, drawn from each corner of a rectangular towel having length 1 and width w, where w, 1, a, and b are rational numbers, and where a and b are less than half the measurement of w and l respectively.

Figure 5:
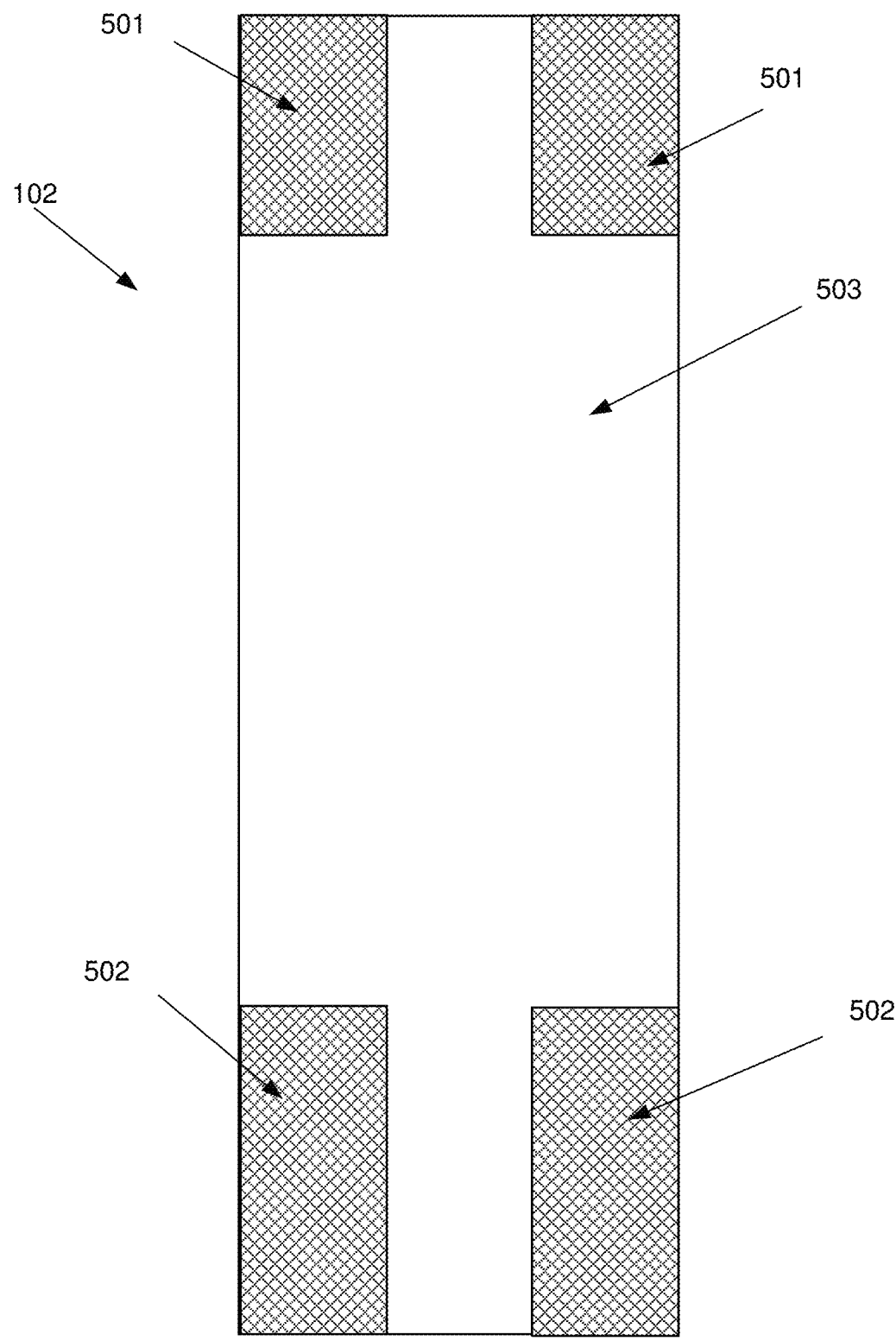
FIG. 5 illustrates a diagram of a configuration of a top layer of an exercise mat, according to one embodiment of the present invention.

FIG. 5 illustrates a diagram of a configuration of a top layer of an exercise mat, according to one embodiment of the present invention. As illustrated, exercise mat 102, can have a top layer having surfaces 501, 502, and 503 and a bottom layer (not shown) forming the base of the yoga mat. In one embodiment, surface 501 and/or 502 are made of a slip resistant material (e.g., natural rubber, Thermoplastic elastomers (TPE), Polyurethane, Vinyl, Poly Vinyl Chloride (PVC), cork, or a combination thereof). Surface 503 can also be made of any other suitable material (e.g., natural rubber, TPE, Polyurethane, Vinyl, PVC, cork, or a combination thereof), however, surface 503 is made using a material different composition than layer 501. In other words, the composition of the materials for surface 501 and 503 are different to accommodate different usage of surface 501, 502, and/or 503. Therefore, in one embodiment, surface 501 and 502 can be configured using a material that has anti-slip properties. Further, in one embodiment, surface 503 can be configured using a material that provides cushioning and comfort to a user working out on exercise mat 102. A person having ordinary skill in the art would appreciate that materials used at surface 501, 502, and/or 503 will be based on the exercise and need of a user. It should be noted that although surface 501 and 502 are shown to be having different areas, this is shown for illustrative purposes only. Thus, in one embodiment, areas 501 and 502 can be configured to have the same area (and/or shape/size). In another embodiment, 501 and 502 have the same material composition (that is, they are made from the same/identical material and provide the same/identical properties).

Figure 6:
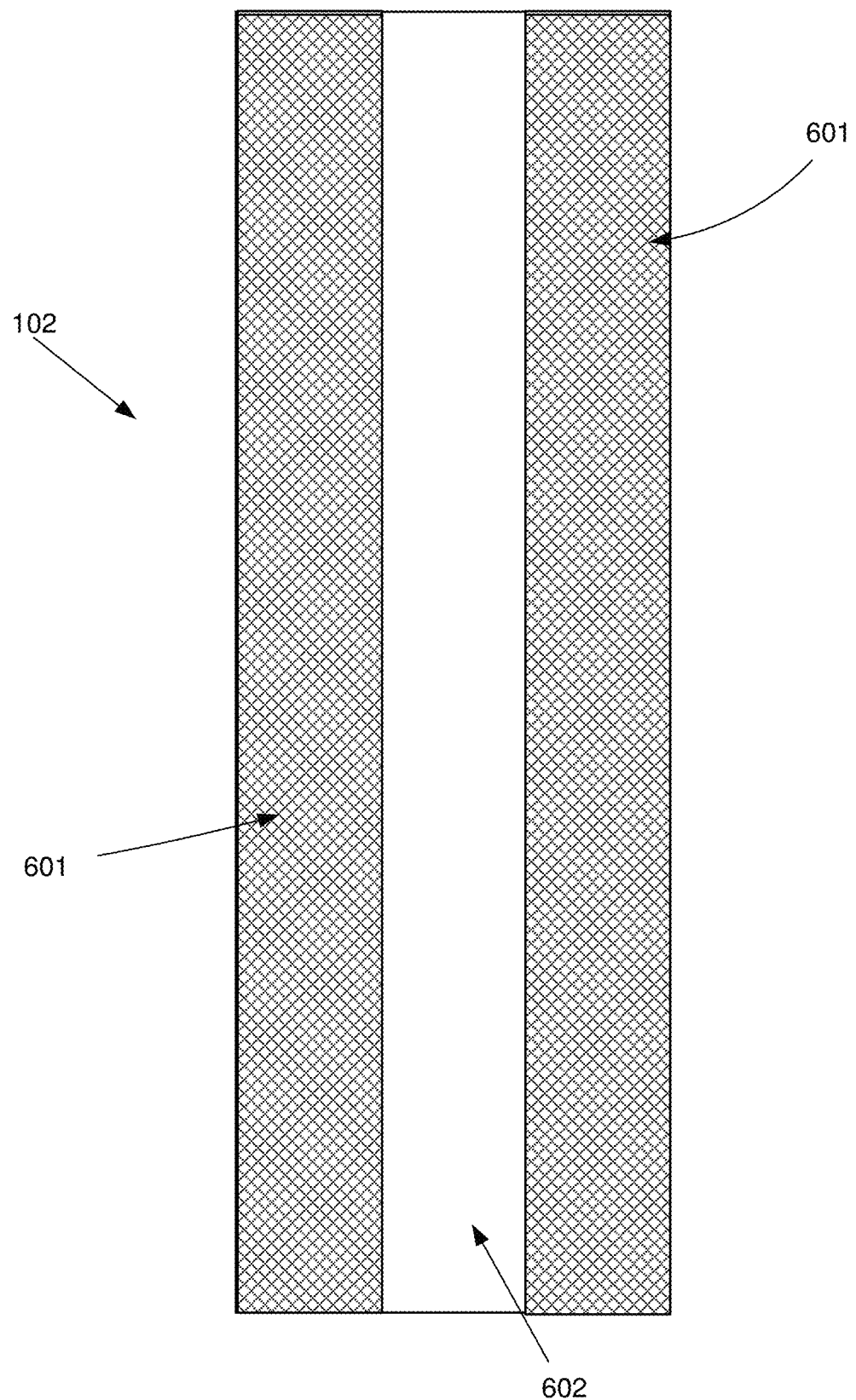
FIG. 6 illustrates a diagram of a configuration of a top layer of an exercise mat, according to one embodiment of the present invention.

FIG. 6 illustrates a diagram of a configuration of a top layer of an exercise mat, according to one embodiment of the present invention. As illustrated, exercise mat 102, can have a top layer having surfaces 601 and 602, and a bottom layer (not shown) forming the base of the yoga mat 102. In one embodiment, surface 601 is made of a slip resistant material (e.g., natural rubber, Thermoplastic elastomers (TPE), Polyurethane, Vinyl, Poly Vinyl Chloride (PVC), or a combination thereof). Surface 602 can be made of any other suitable material (e.g., natural rubber, TPE, Polyurethane, Vinyl, PVC, or a combination thereof), however, surface 602 is made using a material having different composition than layer 601. In other words, the composition of the materials for surface 601 and 602 are different to accommodate different usage of each surface. Therefore, in one embodiment, surface 601 can be configured using a material that has anti-slip properties. Further, in one embodiment, surface 602 can be configured using a material that provides cushioning and comfort to a user working out on exercise mat 102. A person having ordinary skill in the art would appreciate that materials used at surface 501 and/or 602 will be based on the exercise and need of a user.

Figure 7:
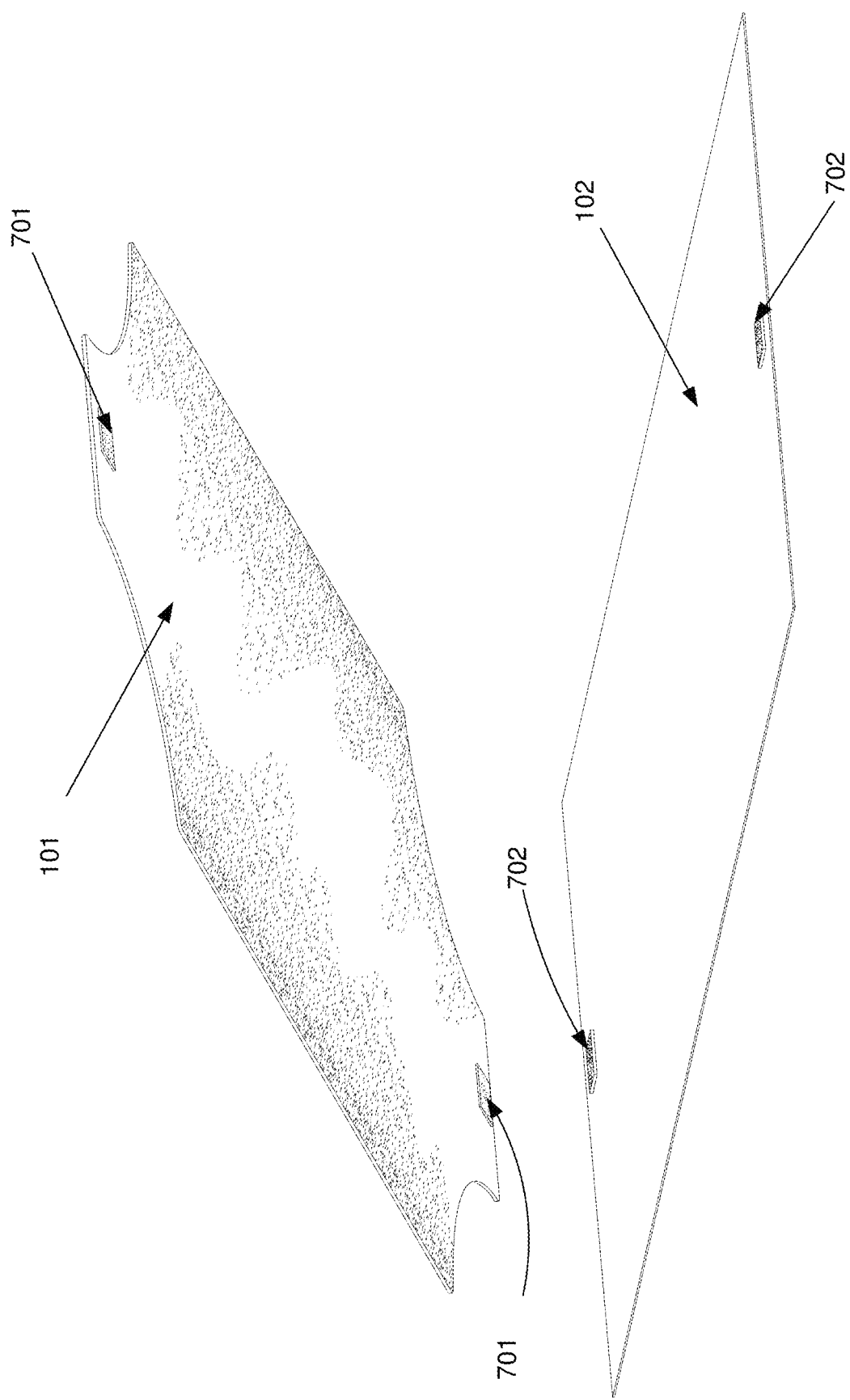
FIG. 7 illustrates a diagram showing a fastening mechanism of an exercise mat and towel assembly, according to one embodiment of the present invention.

FIG. 7 illustrates a diagram showing a fastening mechanism of an exercise mat and towel assembly, according to one embodiment of the present invention. As illustrated, towel 101 and mat 102 can be fastened together using a fastening mechanism. As illustrated, the bottom surface of towel 101 can be coupled to the top surface of the exercise mat 102 by a plurality of hook and loop fasteners 701 and 702. In this embodiment, one surface of a hook and loop fastener, referred to as 701 is coupled to towel 101. The complementary surface of the hook and loop fastener, referred to as 702 is coupled to exercise mat 102. Therefore, in one embodiment, portion 701 of the hook and loop fastener is coupled to a surface of the towel 101, and portion 702 of the hook and loop fastener is coupled to the top surface of the exercise mat 102. When surfaces 701 and 702 couple to each other, towel 101 is fastened to exercise mat 102.

In one embodiment, surface 701 comprises the hook portion of a hook and loop fastener and surface 702 comprises the loop portion of the hook and loop fastener. In another embodiment, surface 701 comprises the loop portion of a hook and loop fastener and surface 702 comprises the hook portion of the hook and loop fastener. Therefore, in one embodiment, portion 701 of the hook and loop fastener is coupled to a surface of the towel 101 is a male component of the hook and loop fastener, and portion 702 of the hook and loop fastener is coupled to the top surface of the exercise mat 102 is a female component of the hook and loop faster. Similarly, in yet another embodiment, portion 701 of the hook and loop fastener is coupled to towel 101 is a female component of the hook and loop fastener, and portion 702 of the hook and loop fastener is coupled to the exercise mat 102 is a male component of the hook and loop faster.

Figure 8:
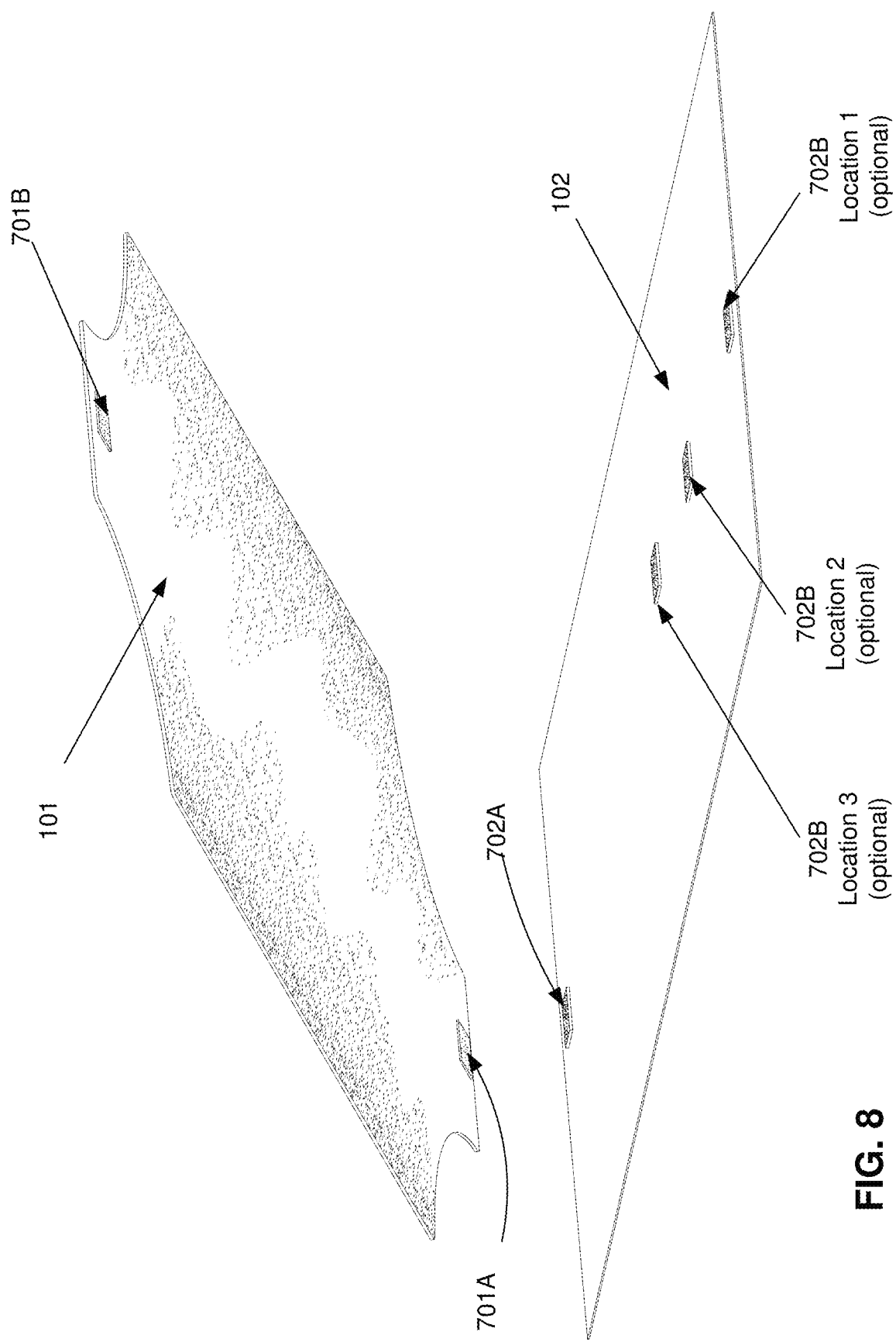
FIG. 8 illustrates a diagram showing an alternative fastening mechanism of an exercise mat and towel assembly, according to one embodiment of the present invention.

FIG. 8 illustrates a diagram showing an alternative fastening mechanism of an exercise mat and towel assembly, according to one embodiment of the present invention. This embodiment, is similar to the embodiments described in FIG. 7, with the exception that the hook and loop fastener portions, referred to as 702B can be coupled to exercise mat 102 at different locations (referred to as location 1, 2, and 3). This assists in coupling towel 101 of shorter or longer length using portion 701B. Presuming portions 701A and 702A are coupled together at the front end of the yoga and towel assembly, 702B can be coupled with exercise mat 102 at different locations as illustrated by location 1, location 2, or location 3. In another embodiment, portion(s) 702B is coupled with exercise mat at location 1, location 2, and/or location 3. This configuration accommodates different lengths of towel 101 to couple 702A at any of the three locations of 702B. It should be noted, a person having ordinary skill in the art would appreciate that portion 702B can be coupled to exercise mat 102 at various locations and that locations 1, 2, and 3, are only shown for illustrative purposes to provide a showing that 702B does not need to be coupled close to a distal end of exercise mat 102.

Figure 9:
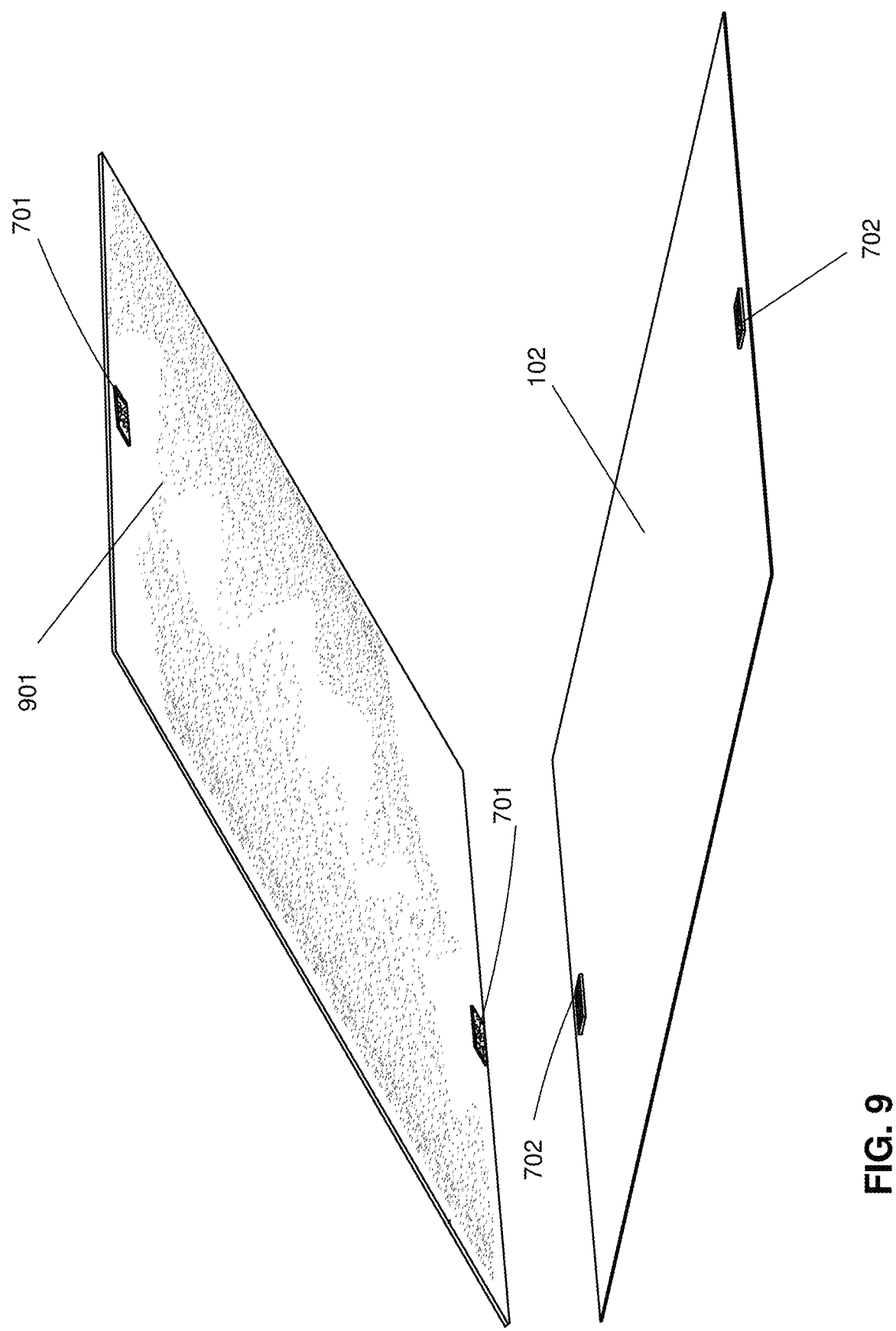
FIG. 9 illustrates a diagram showing an alternative embodiment of an exercise mat and towel assembly with a fastening mechanism, according to one embodiment of the present invention.

FIG. 9 illustrates a diagram showing an alternative embodiment of an exercise mat and towel assembly with a fastening mechanism, according to one embodiment of the present invention. As illustrated, the fastening mechanism can be applied to a towel of any shape. As illustrated fastener portions 701 and 702 are coupled to towel 901 and exercise mat 102 respectively.

Figure 10:
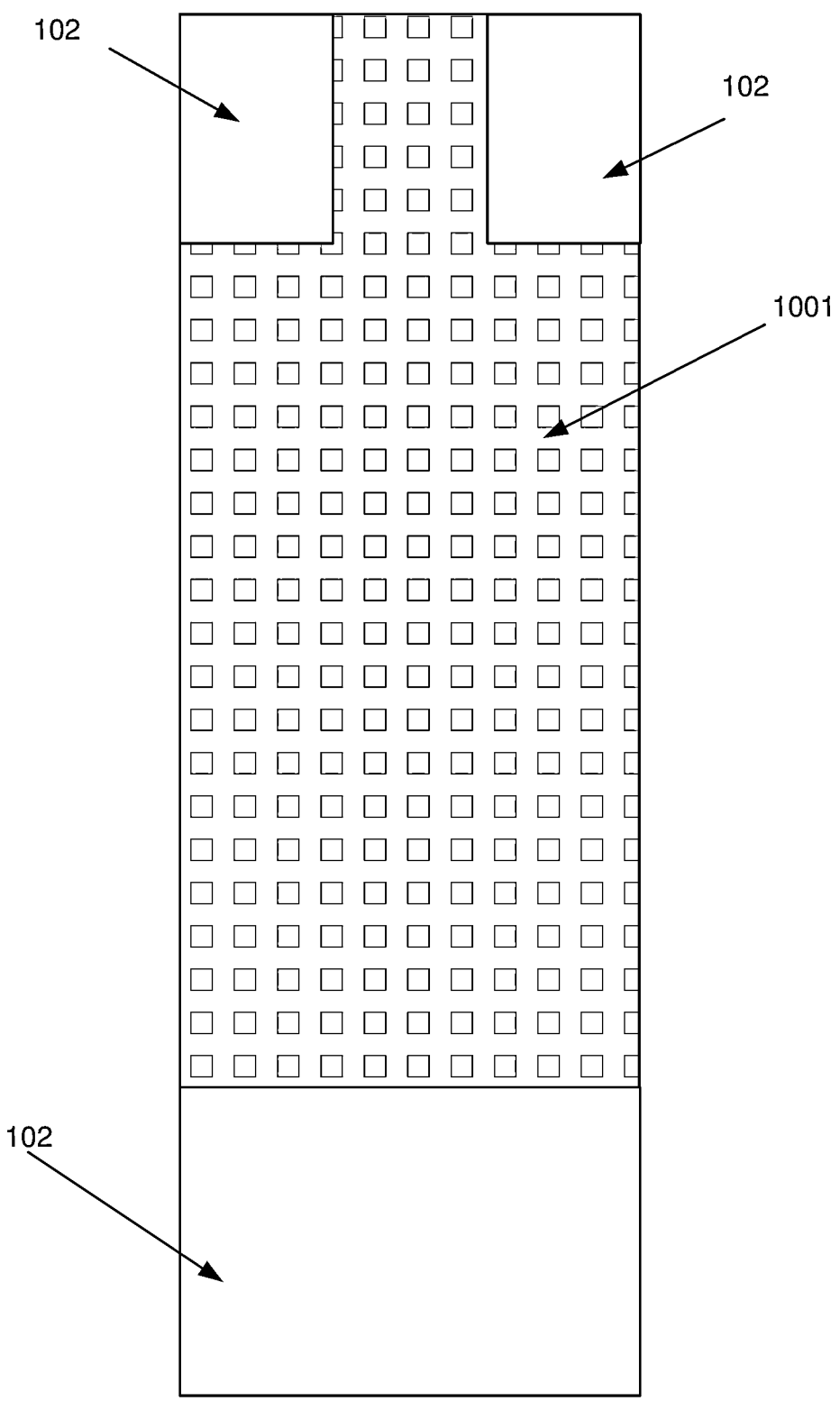
FIG. 10 illustrates a top view diagram of an exercise mat and towel assembly, according to one embodiment of the present invention.

FIG. 10 illustrates a top view diagram of an exercise mat and towel assembly, according to one embodiment of the present invention. As illustrated towel 1001 can be shaped to have chamfers on one distal end only. Chamfers can be of any shape, however, for illustrative purposes the chamfered portion shown in FIG. 10 are rectangular in shape. Towel 1001 can be coupled to exercise mat 102 with or without fasteners.

Figure 11:
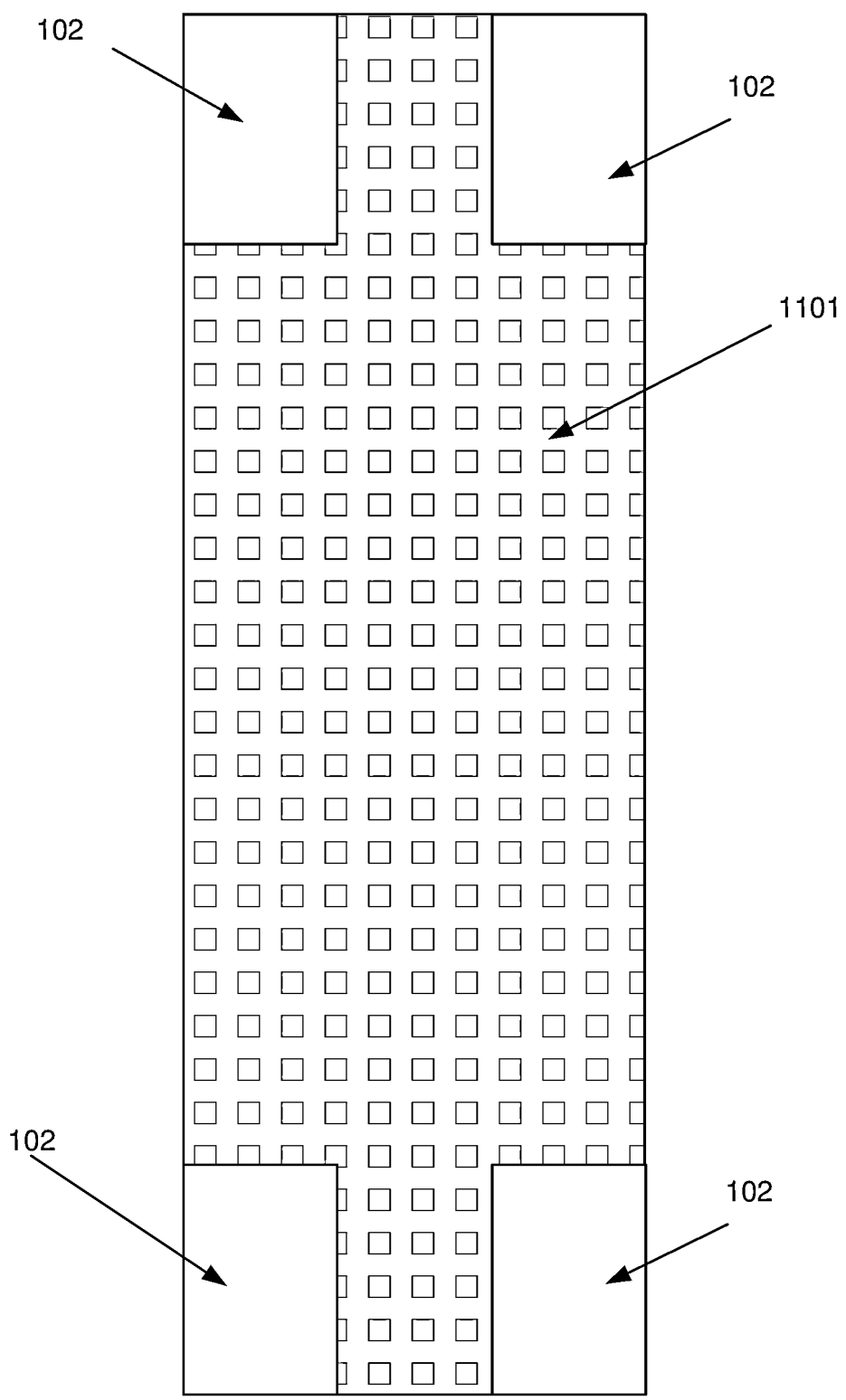
FIG. 11 illustrates a top view diagram of an exercise mat and towel assembly, according to one embodiment of the present invention.

FIG. 11 illustrates a top view diagram of an exercise mat and towel assembly, according to one embodiment of the present invention. As illustrated towel 1201 can be shaped to have chamfers on both distal ends. Chamfers can be of any shape, however, for illustrative purposes the chamfered portion shown in FIG. 11 are rectangular in shape. Towel 1001 can be coupled to exercise mat 102 with or without fasteners.

All the features or embodiment components disclosed in this specification, including any accompanying abstract and drawings, unless expressly stated otherwise, may be replaced by alternative features or components serving the same, equivalent or similar purpose as known by those skilled in the art to achieve the same, equivalent, suitable, or similar results by such alternative feature(s) or component(s) providing a similar function by virtue of their having known suitable properties for the intended purpose. Thus, unless expressly stated otherwise, each feature disclosed is one example only of a generic series of equivalent, or suitable, or similar features known or knowable to those skilled in the art without requiring undue experimentation.

Having fully described at least one embodiment of the present invention, other equivalent or alternative methods of implementing the invention described herein will be apparent to those skilled in the art. Various aspects of the invention have been described above by way of illustration, and the specific embodiments disclosed are not intended to limit the invention to the particular forms disclosed.

The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. An assembly comprising:
    an exercise mat having a top layer and a bottom layer, the top layer having a first exposed surface; and
    a yoga towel comprising a first surface and second surface, wherein the yoga towel is configured to only mate to the top layer of the exercise mat, and wherein the first surface of the yoga towel is configured to be coupled to the first exposed surface of the top layer of the exercise mat, and wherein the total surface area of the first surface of the yoga towel is determined by $(w \times l) - s$,
    wherein w is the width of the exercise mat, and l is the length of the exercise mat, and s is equivalent to an area removed from the first surface of the yoga towel to achieve a desired shape or size, and wherein s is determined as at least one of:
      $\pi.a.b$, wherein a and b are rational numbers that are less than half the measurement of w and/respectively,
      $2r^2$, wherein r is a rational number that is less than half the measurement of w, or
      $2 a.b - (\pi.a.b)/4$, wherein a and b are rational numbers that are less than half the measurement of w and l respectively.

2. The assembly of claim 1, wherein the first surface of the yoga towel is coupled to the top surface of the exercise mat by a plurality of fasteners.

3. The assembly of claim 2, wherein at least one of the plurality of fasteners is a hook and loop fastener, and wherein a portion of the hook and loop fastener is coupled to the first surface of the yoga towel, and wherein another portion of the hook and loop fastener is coupled to the top surface of the exercise mat.

4. The assembly of claim 3, wherein when the portion of the hook and loop fastener is a male component, then the another portion of the hook and loop fastener is a female component, and wherein when the portion of the hook and loop fastener is the female component, then the another portion of the hook and loop fastener is the male component.

5. The assembly of claim 2, wherein at least one of the plurality of fasteners couples the yoga towel to a distal end of the top surface of the exercise mat.

6. The assembly of claim 1, wherein each corner on a distal end of the yoga towel is at least one of chamfered, scalloped, or fileted.

7. The assembly of claim 6, wherein the at least one of chamfered, scalloped, or fileted is configured to intentionally accommodate a user to come in direct contact to the top layer of the exercise mat.

8. An assembly comprising:
    an exercise mat having a top surface and a bottom surface; and
    a yoga towel, wherein the yoga towel is configured to only mate with the top surface of the exercise mat, and wherein one side of the yoga towel has a total surface area defined by $(w \times l) - s$, wherein:

w is the width of the exercise mat, l is the length of the exercise mat, and s is an area removed from the one side of the yoga towel to achieve a desired shape or size, wherein s is determined as at least one of:

$(\pi.a.b)/2,$ a.b, or $(2a.b-\pi.a.b/4)\div 2,$ wherein a and b are rational numbers, each less than half of the measurements of w and/respectively.

9. The assembly of claim 8, wherein at least one corner of the yoga towel is at least one of chamfered, scalloped, or fileted.

10. The assembly of claim 9, wherein the at least one chamfered, scalloped, or fileted corner includes removing at least one of a quarter of a rectangular, square, circular, or elliptical shape from the at least one corner.

11. The assembly of claim 9, wherein the at least one of chamfered, scalloped, or fileted is configured to accommodate a user to come in direct contact with the top surface of the exercise mat.

12. The assembly of claim 8, wherein the one side of the yoga towel is configured to be coupled to the exercise mat by a plurality of fasteners.

13. The assembly of claim 12, wherein at least one of the plurality of fasteners is a hook and loop fastener, and wherein a portion of the hook and loop fastener is coupled to the one side of the yoga towel, and wherein another portion of the hook and loop fastener is coupled to the exercise mat.

14. The assembly of claim 12, wherein at least one of the plurality of fasteners couples the one side of the yoga towel to a distal end of the exercise mat.

* * * * *